(12) United States Patent
Leung

(10) Patent No.: US 6,493,329 B1
(45) Date of Patent: Dec. 10, 2002

(54) ADAPTIVE CHANNEL ESTIMATION IN A WIRELESS COMMUNICATION SYSTEM

(75) Inventor: Gilbert Leung, New Haven, CT (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/379,809

(22) Filed: Aug. 23, 1999

(51) Int. Cl.$^7$ .............................................. H04B 7/216

(52) U.S. Cl. ...................... 370/335; 370/252; 370/500

(58) Field of Search ................................. 370/335, 318, 370/206, 320, 252, 310, 500; 375/130, 144, 147, 148

(56) References Cited

U.S. PATENT DOCUMENTS

| | | | |
|---|---|---|---|
| 4,901,307 A | | 2/1990 | Gilhousen et al. .......... 370/320 |
| 5,103,459 A | | 4/1992 | Gilhousen et al. .......... 370/206 |
| 5,119,196 A | * | 6/1992 | Ayanoglu et al. ........... 348/614 |
| 5,357,574 A | * | 10/1994 | Whitecar ....................... 381/4 |
| 5,506,865 A | | 4/1996 | Weaver, Jr. ................. 370/335 |
| 5,657,420 A | | 8/1997 | Jacobs et al. ............... 704/223 |
| 5,687,198 A | * | 11/1997 | Sexton et al. ............... 375/347 |
| 5,737,327 A | * | 4/1998 | Ling et al. .................. 370/335 |
| 5,764,687 A | | 6/1998 | Easton ........................ 375/147 |
| 5,799,011 A | * | 8/1998 | LaRosa et al. .............. 370/335 |
| 6,101,399 A | * | 8/2000 | Raleigh et al. .............. 455/561 |
| 6,151,484 A | * | 11/2000 | Ramesh ........................ 455/68 |
| 6,219,344 B1 | * | 4/2001 | Jones et al. ................. 370/335 |

OTHER PUBLICATIONS

H. Andoh, et al. "Channel Estimation Filter Using Time Multiplexed Pilot Channel for Coherent Rake Combining in DS–CDMA Mobile Radio," IEICE Transactions on Communications, Institute of Electronics Information and Comm. Eng. Tokyo, JP, vol. E81–B, No. 7, Jul. 1, 1998. (pp. 1517–1525).

M. E. Rollins, et al. "Error Performance Analysis of MLSE for Frequency–Selective Rayleighfading Channels With Kalman Channel Estimation," International Conference on Communications (ICC), US, New York, IEEE, May 1, 1994. pp. 321–326.

\* cited by examiner

Primary Examiner—Hassan Kizou
Assistant Examiner—Saba Tsegaye
(74) Attorney, Agent, or Firm—Philip R. Wadsworth; Kent D. Baker; Roger Martin

(57) ABSTRACT

A method and circuit for adaptively estimating channel conditions of a pilot channel in a wireless communication system. The method includes estimating channel statistics of the pilot channel, and adaptively filtering the pilot channel in response to the estimated channel statistics. The estimation is performed by filtering a channel signal derived from the pilot channel to determine an estimated channel mean and an estimated channel covariance. In order to perform the adaptive filtering, the present invention partitions the pilot channel into one or more time slots and weights each time slot according to the channel statistics. Thus, an advantage of the present invention is that it automatically and continually updates the pilot filter parameters in order to optimize the pilot filter performance over a broad range of channel conditions.

5 Claims, 4 Drawing Sheets

ADAPTIVE CHANNEL ESTIMATION IN A WIRELESS COMMUNICATION SYSTEM

BACKGROUND OF THE INVENTION

I. Field of the Invention

The present invention relates to wireless communication systems. More particularly, the present invention relates to a novel and improved method and apparatus for adaptively estimating the channel conditions of a wireless communication channel.

II. Description of the Related Art

In a wireless radiotelephone communication system, many users communicate over a wireless channel. Communication over the wireless channel can be one of a variety of multiple access techniques that allow a large number of users in a limited frequency spectrum. These multiple access techniques include time division multiple access (TDMA), frequency division multiple access (FDMA), and code division multiple access (CDMA).

The CDMA technique has many advantages. An exemplary CDMA system is described in U.S. Pat. No. 4,901,307, entitled "Spread Spectrum Multiple Access Communication System Using Satellite Or Terrestrial Repeaters", issued Feb. 13, 1990, assigned to the assignee of the present invention, and incorporated herein by reference. An exemplary CDMA system is further described in U.S. Pat. No. 5,103,459, entitled "System And Method For Generating Signal Waveforms In A CDMA Cellular Telephone System", issued Apr. 7, 1992, assigned to the assignee of the present invention, and incorporated herein by reference.

In each of the above patents, the use of a forward-link (base station to mobile station) pilot signal is disclosed. In a typical CDMA wireless communication system, such as that described in EIA/TIA IS-95, the pilot signal is a "beacon" transmitting a constant zero symbol and spread with the same pseudonoise (PN) sequences used by the traffic bearing signals. The pilot signal is typically covered with the all-zero Walsh sequence. During initial system acquisition, the mobile station searches through PN offsets to locate a base station's pilot signal. Once it has acquired the pilot signal, it can then derive a stable phase and magnitude reference for coherent demodulation, such as that described in U.S. Pat. No. 5,764,687 entitled "Mobile Demodulator Architecture For A Spread Spectrum Multiple Access Communication System," issued Jun. 9, 1998, assigned to the assignee of the present invention, and incorporated herein by reference.

A functional block diagram of a typical prior art forward link data formatter as used by a CDMA base station is shown in FIG. 1. Data source 102 may be, for example, a variable rate vocoder such as that described in U.S. Pat. No. 5,657,420, entitled "Variable Rate Vocoder", issued Aug. 8, 1997, assigned to the assignee of the present invention and incorporated herein by reference. Data source 102 generates traffic channel information in the form of frames of digital data. CRC and tail bit generator 104 calculates and appends cyclic redundancy check (CRC) bits and tail bits to the frames generated by data source 102. The frame is then provided to encoder 106, which provides forward error correction coding, such as convolutional encoding, upon the frame as is known in the art. The encoded symbols are provided to repetition generator 120, which repeats the reordered symbols to provide the appropriate modulation symbol rate. The repeated symbols are then provided to interleaver 108, which re-orders the symbols in accordance with a predetermined interleaver format. The repeated, interleaved symbol stream is then covered with one of a set of orthogonal Walsh sequences in traffic Walsh coverer 122, and gain adjusted in gain element 124. It should be understood that other forward link data formatters are also known in the art. For example, it is well known that the repetition generator 120 may be placed after the interleaver 108.

Pilot signal generator 128 generates a pilot signal, which may be a sequence of all ones. The pilot signal is then covered with the all-one Walsh sequence and combined with the output of gain element 124 in combiner 136. The combined pilot channel and traffic channel data (which may be plus or minus ones) is then spread in PN spreader 138 using a complex PN code generated by PN generator 140, and then transmitted by radio frequency transmitter 142 over antenna 144. A similar forward link data formatter is disclosed in co-pending U.S. patent application Ser. No. 08/886,604, entitled "High Data Rate CDMA Wireless Communication System", assigned to the assignee of the present invention and incorporated by reference herein.

Other data formatting techniques also exist. For example, in the cdma2000 reverse link, the pilot signal is time-multiplexed with power control commands. Additionally, in W-CDMA, the forward link uses dedicated pilot signals that are time-multiplexed with other information.

FIG. 2 illustrates a functional block diagram of a typical prior art data demodulator for use in a CDMA mobile station. Receiver 202 receives and downconverts the signals transmitted by transmitter 142 of FIG. 1. The digital baseband output of receiver 202 is despread in PN despreader 204 using the complex PN code generated PN generator 206, which is the same complex PN code as that generated by PN generator 140 of FIG. 1.

The despread signal is then Walsh uncovered in traffic channel Walsh uncoverer 208 using the same Walsh sequence as that of the traffic channel Walsh coverer 122 of FIG. 1. The Walsh-uncovered chips are then accumulated into Walsh symbols in Walsh chip summer 210 and provided as a traffic channel signal to dot product circuit 212. In some applications, an additional delay element (not shown) is introduced between Walsh chip summer 210 and dot product circuit 212 to account for delays introduced by pilot filter 216. However, if pilot filter 216 is a causal filter, such a delay element (not shown) is not necessary. The dot product circuit is also known as a "conjugate product" circuit. It performs the operation expressed mathematically by one of the following equivalent forms: $<a,b>=a \cdot b=ab^*$, where $b^*$ is the complex conjugate of b.

The despread signal is also provided to Walsh chip summer 214 where they are accumulated into Walsh symbols and provided to pilot filter 216 as pilot channel symbols. Note that since the pilot channel is covered with the all-one Walsh sequence in Walsh coverer 134 of FIG. 1, a vacuous operation, the corresponding uncoverer is also vacuous in operation. However, in the general case, the pilot signal may be uncovered using any same Walsh sequence as is used to cover it. The pilot filter 216 serves to reject the noise in the pilot symbols, providing a phase and scale reference for the dot product circuit 212.

Once per symbol, the dot product circuit 212 computes the component of the traffic channel signal in phase with the pilot channel signal generated by the pilot filter 216. As described in U.S. Pat. No. 5,506,865, entitled "Pilot Carrier Dot Product Circuit", issued Apr. 9, 1996, assigned to the assignee of the present invention and incorporated herein by reference, the dot product adjusts both the received signal's phase and scale as needed for coherent demodulation.

The symbols output from dot product circuit 212 are de-interleaved in de-interleaver 218, using the same format used by interleaver 108 of FIG. 1. The de-interleaved symbols are then decoded in decoder 220 according to the error correcting codes employed by encoder 106 of FIG. 1. The resulting decoded symbols are analyzed on a frame-by-frame basis by CRC Check 222 to ensure that the frame was properly decoded. If the frame was properly decoded, then that decoded frame is forwarded for further processing. CRC Check 222 typically would examine the CRC portion of the frame, but may also use other frame quality indications such as Yamamoto metrics.

A typical pilot filter 216 is implemented as an equal-weight finite impulse response (FIR) filter with all defining parameters (e.g., weighting, window width, window center) remaining constant regardless of the channel conditions. Alternately, an exponential decay infinite impulse response (IIR) filter having fixed parameters (e.g., decay time constant, scaling) may be used. In other words, the designer of a typical prior art pilot filter 216 will choose a static filter design that performs adequately for a given energy per bit to noise density ratio ($E_b/N_0$) under most channel conditions of interest, but not optimally over the entire range of conditions.

As a mobile station (e.g., a cellular telephone, PCS telephone or other wireless remote communication terminal) moves through the terrestrial environment, the signals it transmits and receives will experience various types of fading. The mobile environment is usually characterized by fading that can be either Rician or Rayleigh in nature. Other types of fading are also possible. The fading characteristic in the typical channel signal is caused by the signal being reflected from many different features of the physical environment, thus it is called multipath fading. At the UHF frequency bands usually employed for mobile radio communications, including those of cellular mobile telephone systems, significant phase differences in signals traveling on different paths may occur. The possibility for both constructive and destructive summation of the signals may result, with on occasion deep fades occurring.

Multipath channel fading is a function very sensitive to the physical position of the mobile unit. A small change in position of the mobile unit changes the physical delays of all the signal propagation paths, which further results in a different phase for each path. Thus, the motion of the mobile unit through the environment can result in a rapid fading process. For example, in the 850 MHz cellular radio frequency band, this fading can typically be as fast as one fade per second for every mile per hour of vehicle speed. Fading this severe can be extremely disruptive to signals in the terrestrial channel resulting in poor communication quality, particularly as the speed of the mobile station increases beyond 150 km/hr.

As previously stated, the typical fixed-parameter pilot filter 216 is not optimized for such a broad range of channel conditions. It is typically designed to work adequately at speeds from stationary to about 120 km/hr, or about as fast as a mobile station might be expected to travel in a motor vehicle on the highway. However, since the fading characteristics of the channel are vastly different as between a slow-moving mobile station and a fast-moving mobile station, the typical fixed-parameter pilot filter 216 cannot be optimized for both extremes. Typically, this forces the designer to design a pilot filter 216 that works well only when the mobile station is stationary or moves slower than about 150 km/hr, and works poorly beyond 150 km/hr. As transportation such as bullet trains and airplanes exceeds this speed, it is unlikely that the user of a mobile station will be able to obtain reliable communications. Even when operational, the Signal-to-Noise Ratio (SNR) (or in other words, the $E_b/N_0$) of the communication link must be kept at a high enough level to be reliable in these severe fading conditions. Increasing the $E_b/N_0$ of the communication link decreases the total capacity of the wireless system, particularly in a CDMA system where one transmitter's transmissions comprise interference to all other transmitters in the same CDMA frequency band. As a result, the designer of a fixed-parameter pilot filter 216 generally adopts an unfavorable compromise in selecting the filter parameters when faced with such a broad range of channel conditions.

Thus, there is a need for a more optimal pilot filtering method and apparatus, particularly in the wireless communication environment, that avoids these shortcomings in the prior art.

SUMMARY OF THE INVENTION

The present invention is a novel and improved method and circuit for adaptively estimating channel conditions of a pilot channel in a wireless communication system. The method includes estimating channel statistics of the pilot channel, and adaptively filtering the pilot channel in response to the estimated channel statistics. The estimation is performed by filtering a channel signal derived from the pilot channel, or any channel bearing ambiguous data with the ambiguity removed after detection or decoding. This determines an estimated channel mean and an estimated channel covariance. In order to perform the adaptive filtering, the present invention partitions the pilot channel into one or more time slots and weights each time slot according to the estimated channel statistics. Thus, an advantage of the present invention is that it automatically and continually updates the pilot filter parameters in order to optimize the pilot filter performance over a broad range of channel conditions.

In one embodiment of the present invention, the channel signal is filtered in one or more infinite impulse response (IIR) filters to determine the channel statistics. In a another embodiment, the channel signal is filtered in a combination of IIR and finite impulse response (FIR) filters to determine the channel statistics.

In an embodiment applicable to the cdma20000 system wherein the pilot channel comprises a pilot signal portion having a known sign and a power control bit portion having an unknown sign. The method of the present invention may also include determining the sign of the power control bit portion, correcting the sign of the power control bit portion, and then combining the sign-corrected power control bit portion with the pilot signal portion to generate the channel signal from which the channel statistics are estimated by the channel statistics estimator. In yet another embodiment, the method includes determining the sign of the traffic signal and generating the channel signal in response to the traffic signal.

In yet another embodiment applicable to a cdma2000 system, wherein the pilot channel comprises a sequence of power control groups, each power control group having a pilot signal portion having a known sign and a power control bit portion having an unknown sign, the time slots have a duration substantially equal to the duration of the pilot signal portion.

A circuit for performing the method of the present invention is also described herein.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention will now be described in an application that is specific but not limited to the demodulation of a cdma2000 reverse link signal. As is described in the proposed IS-2000 standard, the cdma2000 reverse link signal comprises a traffic channel signal and a reverse link pilot signal. Punctured into the reverse link pilot channel (R-PICH) is a forward link power control subchannel that is a single bit that spans the last quarter of each 1.25 ms power control group (PCG). This forward link power control bit is a signal from the mobile station to the base station transmitter to either increase or decrease its transmit power based on the mobile station's reception quality on the forward link. Such a reverse link pilot is described in detail in co-depending U.S. patent application Ser. No. 08/886,604, now U.S. Pat. No. 6,396,804, issued on May 28, 2002 to Odenwalder et al., entitled "HIGH DATA RATE CDMA WIRELESS COMMUNICATION SYSTEM", assigned to the assignee of the present invention and incorporated by reference herein.

Because the R-PICH is used by the base station as a coherent reference for data demodulation, a frequency reference for frequency tracking, and a received power reference for power control measurements, the uncertainty introduced by the forward link power control subchannel in the otherwise determinate signal could degrade the reverse link performance. In other words, the puncturing of the forward link power control subchannel into the R-PICH could lead to poorer the reverse link performance than a continuous pilot channel. For example, if we use only the non-punctured portion of the pilot channel to estimate the channel, the signal-to-noise ratio of the channel estimate calculated by the base station is decreased. A technique for resolving the sign ambiguity of the R-PICH and reconstructing a continuous pilot signal therefrom is given in copending U.S. patent application Ser. No. 09/298,394, now U.S. Pat. No. 6,304,563 issued on Oct. 16, 2001 to Blessent et al. entitled "METHOD AND APPARATUS FOR PROCESSING A PUNCTURED PILOT CHANNEL", filed Jul. 12, 1999, assigned to the assignee of the present invention and incorporated herein by reference.

It will be understood by a person of ordinary skill in the art that although the present invention is disclosed with reference to a cdma2000 system having a R-PICH with a punctured power control subchannel, the present invention is equally applicable to other wireless communication systems having a non-punctured pilot channel. Thus, the following figures are intended to be example applications of the present invention and are not intended to limit the present invention to the cdma2000 system.

Figure 1:
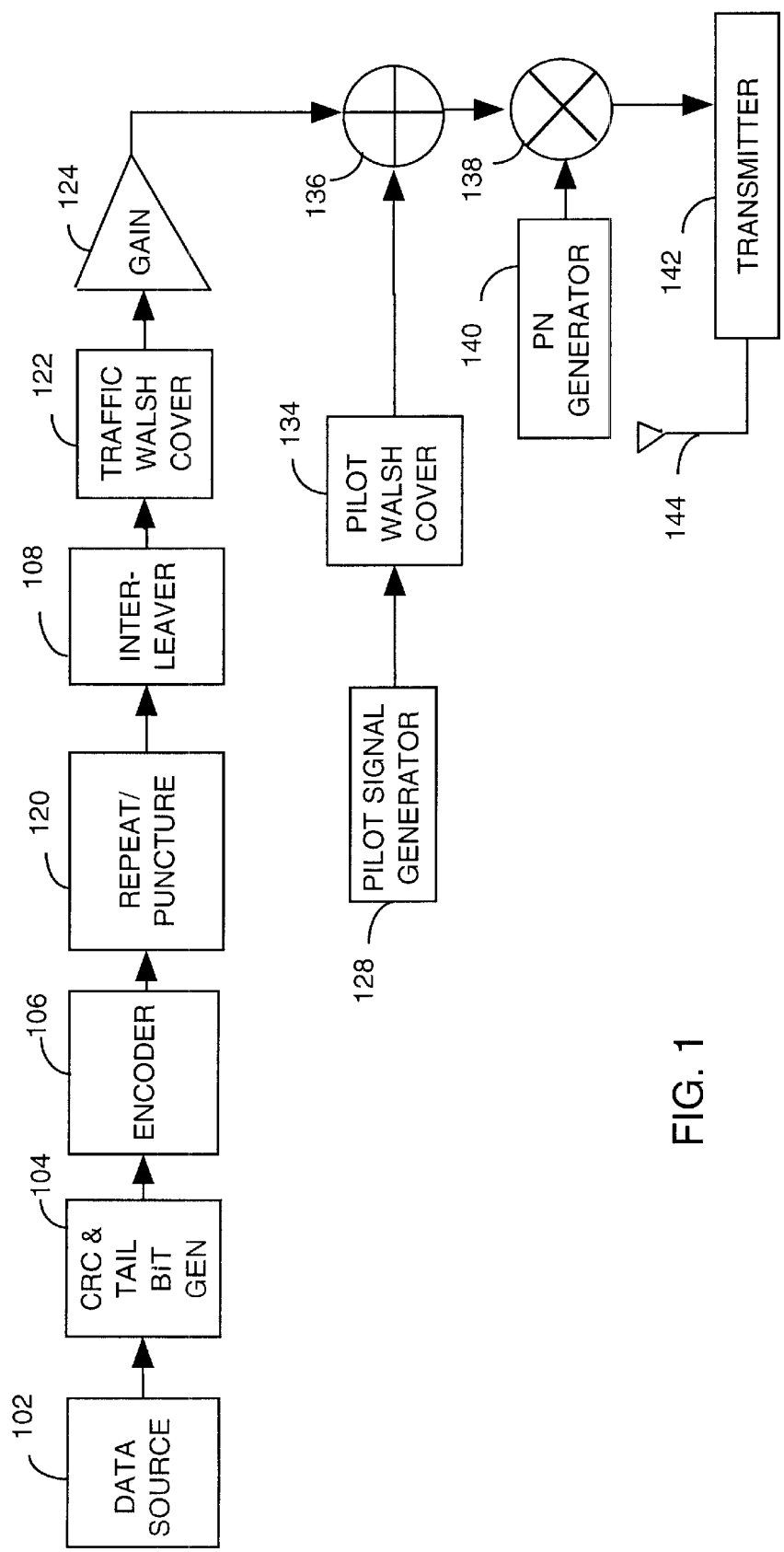
FIG. 1 is functional block diagram of a typical prior art forward link data formatter as used by a CDMA base station.
Figure 2:
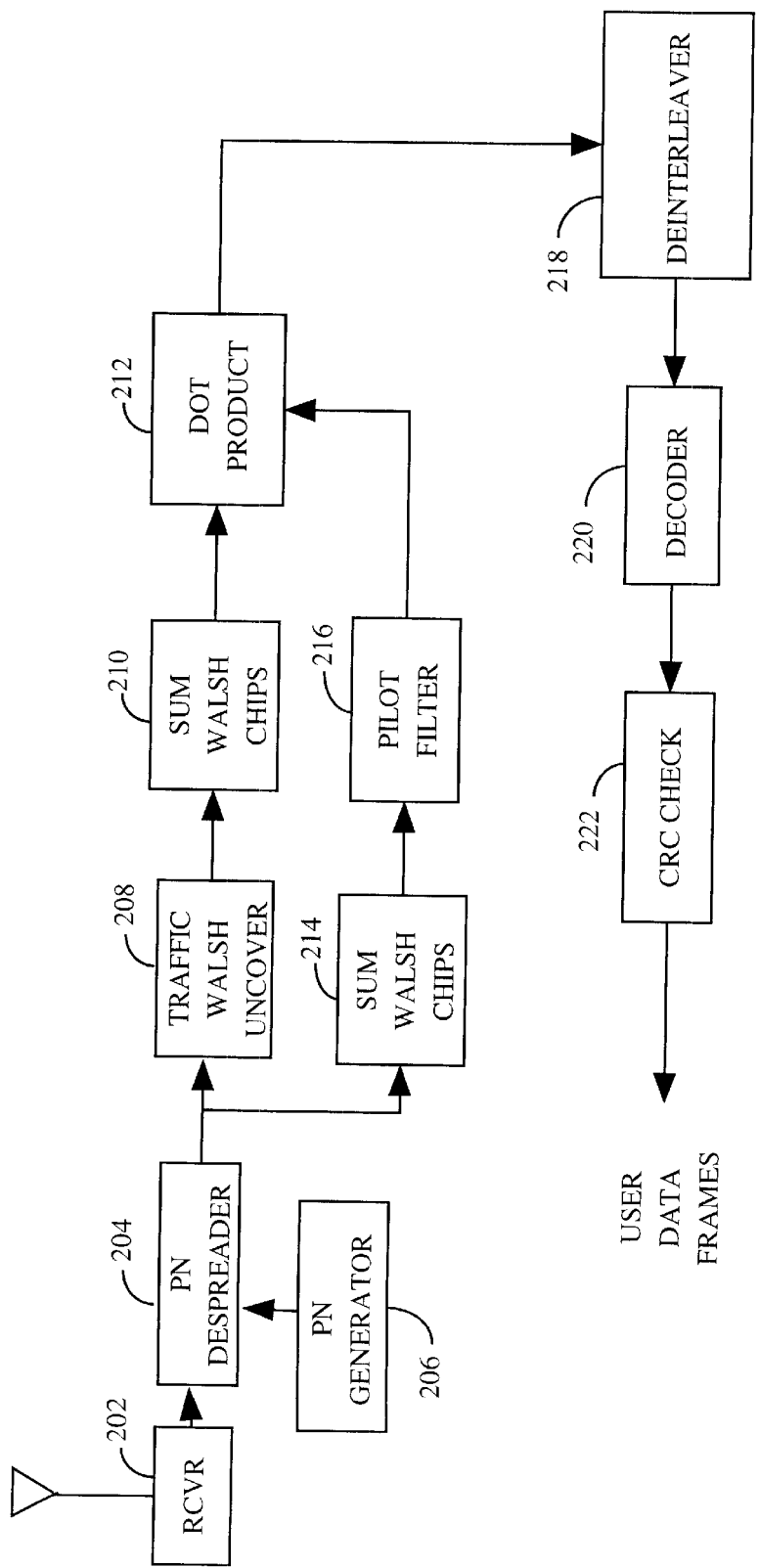
FIG. 2 is a functional block diagram of a typical prior art demodulator for use in a CDMA mobile station.
Figure 3:
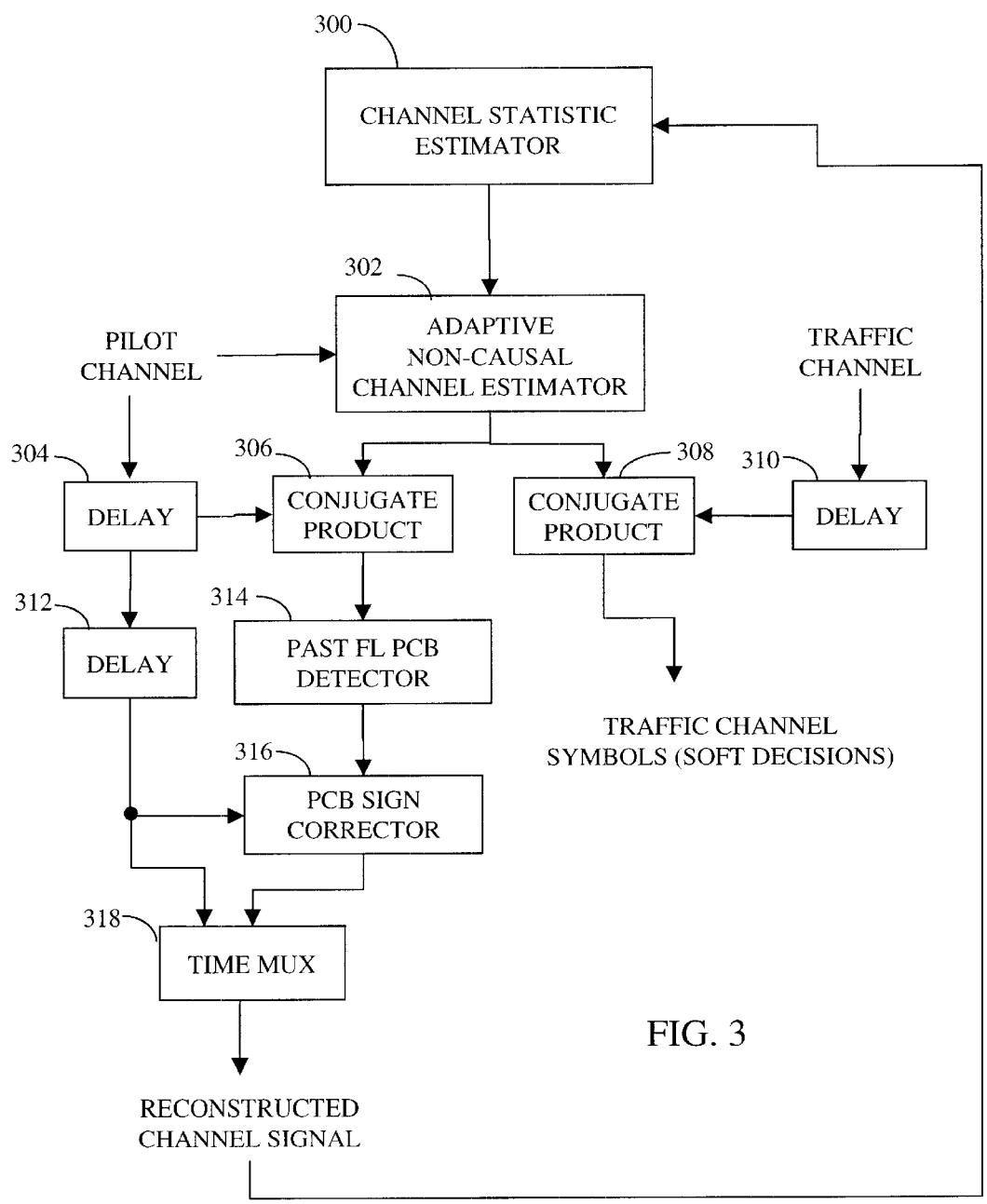
FIG. 3 is a first embodiment of the present invention illustrated as being implemented in a cdma2000 reverse link traffic channel demodulator.

Turning now to FIG. 3, a first embodiment of the present invention is illustrated as being implemented in a cdma2000 reverse link traffic channel demodulator. Channel statistic estimator 300 estimates channel statistics which are used by adaptive non-causal channel estimator 302 to adaptively filter the pilot channel as will be discussed in more detail below. It should be noted that in other embodiments, indeed in the embodiment of FIG. 4 described below, an adaptive causal channel estimator or filter may be used in place of adaptive non-causal channel estimator 302. However, in the embodiment of FIG. 3, a non-causal filter is used for channel estimation due to its improved performance over a causal filter when the delay of the non-causal filter is tolerable. In the exemplary embodiment of FIG. 3, adaptive non-causal channel estimator 302 is an FIR filter. However, in the general case, adaptive non-causal channel estimator 302 may be an IIR filter or a hybrid filter with both FIR and IIR characteristics. One simple example is a filter that outputs the difference of two exponential decay IIR filters of the same time constant but different weights, such that the effective impulse response of the filter is of finite extent. Another example would be a cascaded FIR and IIR filter.

The filtered pilot channel symbols are then input to conjugate product circuits 306 and 308. Conjugate product circuit 308 also receives as a second input, the despread, Walsh uncovered, and delayed traffic channel that has been delayed by delay circuit 310. Delay circuit 310 delays the traffic channel by an amount substantially equal to the delay introduced by adaptive non-causal channel estimator 302. Conjugate product circuit 308 produces traffic channel symbols (soft decisions) for further de-interleaving and decoding as is known in the art.

Conjugate product circuit 306 receives as a second input the delayed pilot channel that has been delayed by delay circuit 304. Delay circuit 304 delays the pilot channel by an amount substantially equal to the delay introduced by adaptive non-causal channel estimator 302. Conjugate product circuit 306 performs a conjugate multiplication of the estimator 302 output with the delayed pilot channel which contains a power control bit punctured into the reverse link pilot channel. Conjugate product circuit then forwards the resultant power control bit signal to past forward link (FL) power control bit (PCB) detector 314.

Past FL PCB detector 314 compares the resultant power control bit signal to a threshold and thereby determines the sign of the punctured FL PCB. It should be noted that the term "past" is used in describing the operation performed by past FL PCB detector 314 because the power control bit being detected at any given time is the power control bit from a past power control group, as delayed by delay 304 and adaptive non-causal channel estimator 302. The FL PCB decision determined by past FL PCB detector 314 is then forwarded to PCB sign corrector 316 where the sign of the PCB is flipped, if necessary, to match the sign of the remainder of the pilot channel (+1). The output of PCB sign corrector 316 is then provided, along with the further delayed pilot channel from delay 312, to time multiplexer (MUX) 318. Time MUX 318 provides, during the first ¾ of the power control group, an output equal to the further delayed pilot channel from delay 312, which compensates for the processing time of the past FL PCB detector 314. Time MUX 318 provides, during the remaining ¼ of the power control group, the output of PCB sign corrector 316 which is now equal in sign (+1) to the pilot channel. The resulting output signal from time MUX 318, is, therefore, a reconstructed pilot channel signal of constant sign. A similar technique for continuous pilot channel reconstruction in given in the above-incorporated co-pending application Ser. No. 09/298,394 now U.S. Pat. No. 6,304,563.

The reconstructed channel signal is provided to channel statistic estimator 300 which estimates channel statistics therefrom for use in setting the weighting factors used by adaptive non-causal channel estimator 302 as mentioned above. The generation of channel statistics by channel statistic estimator 300 and the application of weighting factors by adaptive non-causal channel estimator 302 will be discussed in further detail below.

It should be noted that the elements in the left-hand side of FIG. 3 that are involved solely in generating the reconstructed channel signal for use by channel statistic estimator 300 (i.e., delay 304, conjugate product circuit 306, delay 312, past FL PCB detector 314, PCB sign corrector 316 and time MUX 318) are necessary only for a punctured pilot channel such as the R-PICH of the cdma2000 reverse link. These elements may be omitted in applications having a non-punctured or otherwise continuous pilot channel. In such a case, the pilot channel signal itself may be sufficient for use by channel statistic estimator 300. Furthermore, the channel signal may also be generated from the additional energy contained in the traffic signal using the method described in co-pending U.S. patent application Ser. No. 09/289,073, entitled "CHANNEL ESTIMATION IN A CDMA WIRELESS COMMUNICATION SYSTEM", filed Apr. 8, 1999, assigned to the assignee of the present invention and incorporated herein by reference. In the just-mentioned patent application, the decoded traffic channel symbols are re-encoded, re-interleaved, weighted according to the frame quality indicator and combined with the pilot channel estimate, which in FIG. 3, would be the reconstructed channel signal output from time MUX 318. Thus, in the general case, the generation of the channel signal, i.e., a signal that represents the channel, may be a weighted combination of contributions from the pilot portion of the R-PICH, the sign-corrected FL PCB from the R-PICH, and the sign-corrected traffic from one or more traffic channels.

Figure 4:
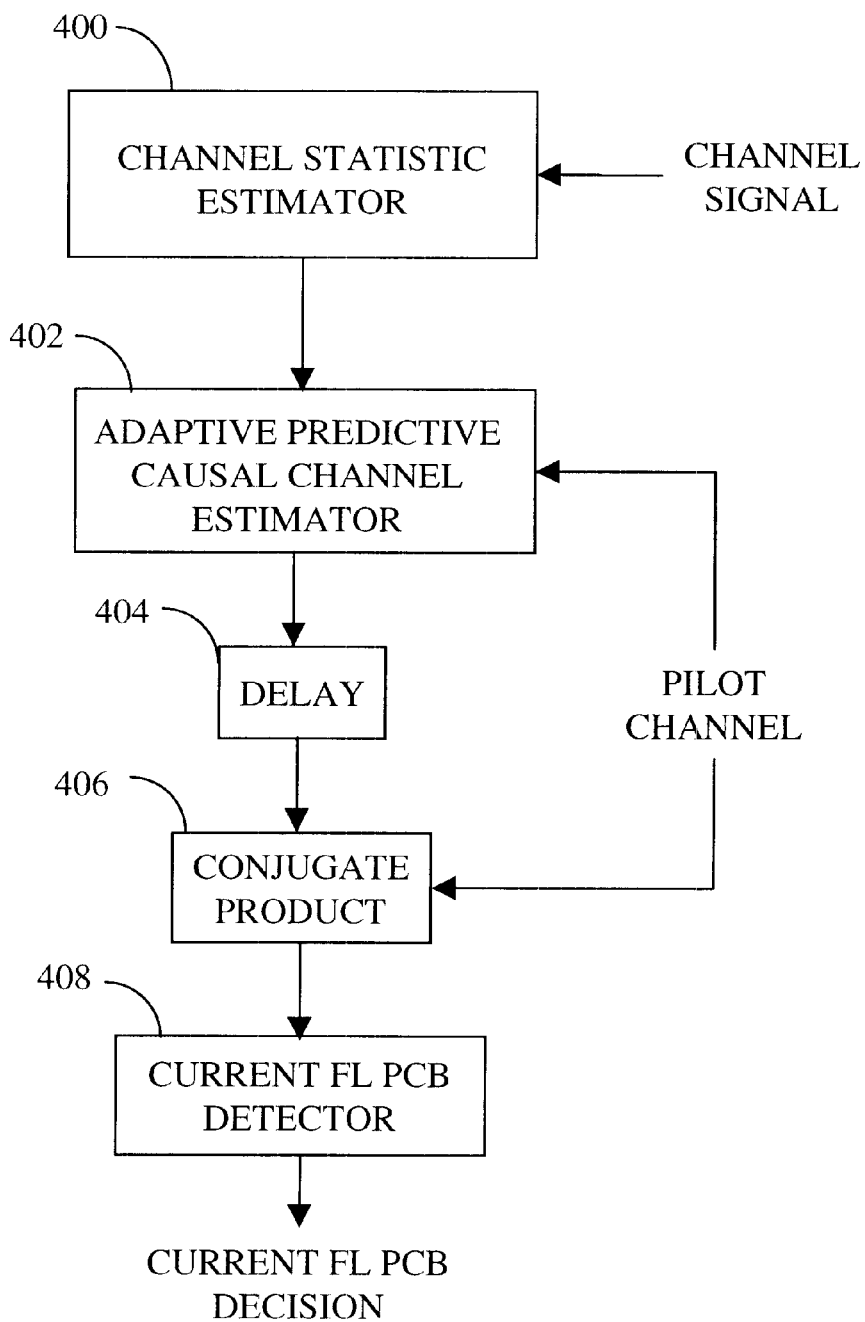
FIG. 4 is a second embodiment of the present invention illustrated as being implemented in a cdma2000 forward link power control bit demodulator.

Turning now to FIG. 4, a second embodiment of the present invention is illustrated as being implemented in a forward link power control bit demodulator. In FIG. 4, channel statistic estimator 400, which may be the same as channel statistic estimator 300 of FIG. 3, is illustrated as receiving the channel signal, which may be the reconstructed channel signal of FIG. 3 in the case of a the R-PICH demodulator of FIG. 3, or a reconstructed channel signal from a sign-corrected traffic channel after successful decoding, re-encoding, and re-interleaving as detailed in the above-referenced U.S. patent application Ser. No. 09/289, 073, or a weighted combination of the two signals. In the general case, channel statistics estimator 400 may be different than channel statistics estimator 300. Both may use essentially the same algorithm, described in detail below, but they may operate on different data, or over different time slots, or even different channel signal inputs. The channel signal is operated on by channel statistic estimator 400 as will be described further below in order to estimate the channel statistics by which adaptive predictive causal channel estimator 402 will assign filter weighting coefficients. In the exemplary embodiment of FIG. 4, adaptive predictive causal channel estimator 402 is an FIR filter. However, in the general case, it may be an IIR filter, or a hybrid filter having both FIR and IIR characteristics.

Adaptive predictive causal channel estimator 402 provides a channel estimate through delay 404 to conjugate product circuit 406. Conjugate product circuit 406 performs a conjugate multiplication on the channel estimate and the pilot channel (in this case, the R-PICH) to demodulate the FL PCB punctured into the R-PICH. The resultant power control bit signal is then forwarded to current FL PCB detector 408 for determination of the sign of the current FL PCB. Current FL PCB detector 408 may be of similar construction to past FL PCB detector 314 of FIG. 3. Current FL PCB detector 408 estimates a current FL PCB decision regarding the sign of the FL PCB by comparing the power control bit signal from conjugate product circuit 406 to a threshold. The current FL PCB decision may then be used by the forward link transmitter (not shown) to increase or decrease its power as necessary.

As described above, in both the embodiments of FIG. 3 and FIG. 4, the channel statistic estimators 300 and 400 estimate channel statistics for use by adaptive non-causal channel estimator 302 and adaptive predictive causal channel estimator 402, respectively, in setting their respective filter coefficients. To explain how this process occurs, the following mathematical description will be introduced. First, consider the received channel signal of a particular Rake finger of a Rake receiver entering the mobile station channel statistic estimator 300 or 400 input. This received signal is of the form:

$$y[n]=a[n]+w[n] \qquad (1)$$

where
y[n] is a column vector representing the actual received channel signal at time slot n;

a[n] is a column vector representing the actual information signal as a true representation of the channel at time slot n;

w[n] is a column vector representing the actual noise contained in the channel signal at time slot n; and n is a vector index in the time domain, and therefore may represent an arbitrary time slot for sampling the received channel signal.

Therefore, the dimension of the column vectors a[n], w[n], y[n], or the number of integral values that n can take on, is the same as the number of time slots of received channel signal used as input for adaptive channel estimation. In the second exemplary embodiment applicable to the predictive estimation of a FL PCB in a cdma2000 R-PICH, each time slot may be ¾ of a single 1.25 ms power control group (i.e., the non-punctured portion of the pilot channel). Thus, if we use 2 PCG worth of channel signal as input for estimation, as n ranges from 1 and 2, y[1] represents the received channel signal of the current ¾ PCG of pilot whereas y[2] represents the received channel signal of the previous ¾ PCG of pilot. These y[1] and y[2] values can be obtained by simple averaging of pilot symbols over the said ¾ PCG of pilots.

Other embodiments may use larger or smaller time slots depending on the resolution and estimation accuracy desired as a tradeoff to the costs of computation. For example, in the cdma2000 embodiment, the punctured FL PCB may be one coherent time slot, with an ambiguous sign, or it can comprise several smaller coherent time slots if finer resolution is desired. In the general case, the time slots may be of unequal duration, though the received channel signal at each time slot could be weighted appropriately to normalize the information signal amplitude or, depending on the application, the signal-to-noise ratio. In other embodiments, the time slots may be a configurable parameter. If a partition of the channel signal into finer time slots is used, the index n can range from one to a higher number. If a non-causal estimator is desired, as in the embodiment of FIG. 3, some of the elements of the column vectors y[n], a[n], and w[n] may also represent values after the time of interest in the system where the channel estimate is desired.

We must estimate the actual channel value x at a given moment, as shown below in Equation (2). Equation (2) represents the operation performed by both adaptive non-causal channel estimator 302 and adaptive predictive causal channel estimator 402. One difference between the two applications are the different partitions of the channel signal into different time slots as discussed above. Note that all estimates herein are denoted by the ^ ("hat") notation Let x be the desired channel value at a time slot of interest. For example, while the index n for the y, a, and w vectors takes on the values 1 and 2 representing the pilot portions of the pilot channel during the current and previous PCGs as in the exemplary embodiment of FIG. 4, x represents the channel value at the current PCB portion of the pilot channel, $$\hat{x} = \hat{m}_x + H(y[n] - \hat{m}_y[n]) \quad (2)$$

where $\hat{x}$ is the estimated channel value at the time slot corresponding to the PCB portion of the pilot channel, $\hat{m}_x$ is the estimated mean of x;

$\hat{m}_y[n]$ is the estimated mean of the channel signal at time slot n; and

H is a filter vector described by $H = \hat{K}_{xy}(\hat{K}_{yy})^{-1}$ where:

$\hat{K}_{xy}$ is the estimated covariance matrix of the x and y[n]; and $\hat{K}_{yy}$ is the estimated covariance matrix of the vector y[n], and the superscript −1 represents the matrix inversion operation.

In other words, H is a vector representation of a linear filter that when the filter is applied to an arbitrary signal z[n], the output resulting from the operation can be described in the following in time domain notation:

$$H(z[k]) = \sum_k h[k] z[k] \quad (3)$$

where k is the vector index.

It is also possible to make x into a vector by packing more values into it when the channel estimate at multiple time instances are desired, especially if this provides extra implementational convenience in some embodiment of application due to the computational architecture used. Thus:

$$H(z[k]) = \sum_k h[j, k] z[k] \quad (3a)$$

where H now represents the filter matrix, and j and k are the vector indices for the row and column, respectively, with j being the index of a particular element $\hat{x}[j]$ in the vector x to be estimated.

The values $\hat{m}_y[n]$, $\hat{K}_{xy}$, and $\hat{K}_{yy}$ are what are referred to herein as the estimated channel statistics. These are the values estimated by channel statistics estimator 300 and 400 for use by adaptive non-causal channel estimator 302 and adaptive predictive causal channel estimator 402, respectively, in determining the filter weighting used to estimate $\hat{x}$. Thus, these channel statistics are the needed components of Equation (2) above, given that y[n], the actual received channel signal, is already known.

Next, the generation of these channel statistics is described. Channel statistic estimators 300 and 400 generate the estimated channel signal mean, $\hat{m}_y[n]$, according to the following relationship:

$$\hat{m}_y[n] = g_1 * y[n] \quad (4)$$

where $g_1$ is a filter impulse response, which in the general case may be either an FIR or an IIR or hybrid filter that has both FIR and IIR characteristics; and the operator * represents convolution in the time domain.

Note that y[n] now represents a signal vector in time, and the time index over which the convolution operation is applied is not shown. If it were shown, both $\hat{m}_y[n]$ and y[n] would have two indices, with the first one (shown) representing the time slots (e.g. "current PCG" and "previous PCG" as used for the second exemplary embodiment of the application above), and the second (not shown) representing the updating of the vector values as what is "current time" proceeds.

The same method is used to calculate the estimate $\hat{m}_x[n]$ since the elements of $\hat{m}_x[n]$ represent the estimated channel just as the elements of $\hat{K}_y[n]$ do, though at perhaps different time slots, so that only a shuffling of time slot indices is required before the direct application of the same method. Note that the channel mean usually does not change often, and when the time slots used as estimation inputs are close together in time, we may use one single value to represent all the elements in $\hat{m}_x[n]$, $\hat{m}_y[n]$ because they are similar in value, thus possibly saving computation. In another embodiment of application of the present invention in which the channel is known to have zero-mean, $\hat{m}_x[n]$, $\hat{m}_y[n]$ can be taken to be zero, thus simplifying Equation (2).

$$\hat{x}[n] = H(y[n]) \quad (2b)$$

Channel statistic estimators 300 and 400 generate $\hat{K}_{xy}$, the estimated covariance of x and the vector y[n] according to the following relationship:

$$\hat{K}_{xy}[m,n] = g_2 * (x[m] y^*[n]) \quad (5)$$

where $g_2$ is a filter impulse response, which in the general case may be either an FIR or an IIR or hybrid filter that has both FIR and IIR characteristics;

m and n are the row and column vector indices, respectively; and y*[n] is the conjugate of y[n].

Again, the time index over which the convolution operation is applied is not shown.

Channel statistic estimators 300 and 400 generate $\hat{K}_{yy}$, the estimated covariance of the y[n] vector according to the following relationship:

$$\hat{K}_{yy}[n,m] = g_3 * (y[n] y^*[m]) \quad (6)$$

where $g_3$ is a filter impulse response, which in the general case may be either an FIR or an IIR or hybrid filter that has both FIR and IIR characteristics; and y*[m] is the conjugate of y[m].

Again, the time index over which the convolution operation is applied is not shown. The present invention also contemplates taking advantage of the fact that $\hat{K}_{yy}$ may be conjugate symmetric, that is, $$\hat{K}_{yy}[m,n] = \hat{K}_{yy}^*[n,m] \quad (7)$$

such that only half of the values in the matrix $\hat{K}_{yy}$ need to be computed.

In addition, if part of the received channel signal vector y[n] has time slots of equal durations representing values equally spaced in time, we may also take advantage of the shift-invariant property of the covariance function and save computation further, $$\hat{K}_{yy}[m,n]=\hat{K}_{yy}[m+k,n+k] \quad (8)$$

where k is any integer value as long as m+k and n+k are within the scope of valid indices of the matrix $\hat{K}_{yy}$ and where the above assumption about the partition of time slots is true.

The time constants of these three filters, $g_1$, $g_2$, $g_3$, are usually picked for the particular application at hand depending on the system parameters. For example, if the channel statistics do not change over a duration of time on the order of one second, the time constants of the filters $g_1$, $g_2$, $g_3$, may be chosen to be one second or shorter.

When multiple Rake fingers are used, a more sophisticated application of the present invention can make sure that the channel statistics from the different fingers are the same or similar, and use all the channel signals y[n] from different fingers for the statistics estimation, giving more accurate estimates due to the increased amount of available input for estimating the same or similar values of channel statistics.

So, as can be seen from the above mathematical relationships, channel statistic estimators 300 and 400 generate the channel statistics $\hat{m}_x$, $\hat{m}_y$, $\hat{K}_{xy}$, and $\hat{K}_{yy}$. These are in turn provided to the respective channel estimators (both adaptive non-causal channel estimator 302 and adaptive predictive causal channel estimator 402, which may also be referred to generically as "pilot filters"). The channel estimators of FIG. 3 and FIG. 4 then use these channel statistics in carrying out the operation described by Equation (2) above, i.e., adaptively estimating the channel conditions.

Central to the present invention is the concept that the channel statistics are slowly but constantly changing as the mobile station moves through the fading environment. These channel statistics are continually updated by channel statistic estimators 300 and 400 for use by adaptive non-causal channel estimator 302 and adaptive predictive causal channel estimator 402, respectively. Because these channel statistics form the basis for Equation (2), the adaptive filtering operation, both adaptive non-causal channel estimator 302 and adaptive predictive causal channel estimator 402 are changing their filter parameters in response to changes in channel conditions.

Advantageous to the present invention, Equation (2) gives an estimator that minimizes the mean squared error of the estimate output. Moreover, the present invention provides convenient and efficient methods to automatically calculate all the ingredients for employing this equation. Thus, both adaptive non-causal channel estimator 302 and adaptive predictive causal channel estimator 402 are continually updated by channel statistic estimators 300 and 400, respectively, such that they are optimized under the then-prevailing channel conditions. This allows both adaptive non-causal channel estimator 302 and adaptive predictive causal channel estimator 402 to generate the best channel estimate for a given channel condition under a broad range of channel conditions. In sharp contrast to the prior art, the present invention provides a method and apparatus for adaptively estimating the channel conditions in a wireless communication system based on the use of estimated channel statistics to determine the channel estimator's filter parameters. Thus, the present invention is always optimized for the current channel conditions, resulting in a significantly lower communication link $E_b/N_0$ requirement for a given bit error rate.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for adaptively estimating channel conditions of a pilot channel in a wireless communication system, the method comprising the steps of:

estimating channel statistics of said pilot channel; and adaptively filtering said pilot channel in response to said estimated channel statistics;

wherein said estimating step further comprises filtering a channel signal derived from any received communication channels to determine an estimated channel mean and an estimated channel covariance;

wherein said pilot channel comprises a pilot signal portion having a known sign and a power control bit portion having an unknown sign, the method further comprising the steps of:

determining said sign of said power control bit portion;

correcting said sign of said power control bit portion;

combining said sign-corrected power control bit portion with said pilot signal portion to generate said channel signal.

2. A method for adaptively estimating channel conditions of a pilot channel in a wireless communication system, the method comprising the steps of:

estimating channel statistics of said pilot channel; and adaptively filtering said pilot channel in response to said estimated channel statistics;

wherein said estimating step further comprises filtering a channel signal derived from any received communication channels to determine an estimated channel mean and an estimated channel covariance;

wherein said step of adaptively filtering said pilot channel comprises the steps of:

partitioning said pilot channel into one or more time slots; and weighting each time slot according to said estimated channel statistics wherein said wireless communication system further comprises a traffic channel, said traffic channel having a traffic signal of unknown signs the method further comprising the steps of:

determining said signs of said traffic signal;

generating said channel signal in response to said traffic signal.

3. A method for adaptively estimating channel conditions of a pilot channel in a wireless communication system, the method comprising the steps of:

estimating channel statistics of said pilot channel; and adaptively filtering said pilot channel in response to said estimated channel statistics;

wherein said estimating step further comprises filtering a channel signal derived from any received communication channels to determine an estimated channel mean and an estimated channel covariance;

wherein said step of adaptively filtering said pilot channel comprises the steps of:
  partitioning said pilot channel into one or more time slots; and
  weighting each time slot according to said estimated channel statistics wherein said pilot channel comprises a sequence of power control groups, each power control group having a pilot signal portion having a known sign and a power control bit portion having an unknown sign, and wherein said time slot has a duration substantially equal to the duration of said pilot signal portion.

4. A circuit for adaptively estimating channel conditions of a pilot channel in a wireless communication system, the circuit comprising:
  a channel statistics estimator that estimates channel statistics of said pilot channel; and
  an adaptive pilot filter that adaptively filters said pilot channel in response to said estimated channel statistics;
  wherein said channel statistics estimator filters a channel signal derived from said pilot channel to determine an estimated channel mean and an estimated channel covariance;
  wherein said pilot channel comprises a pilot signal portion having a known sign and a power control bit portion having an unknown sign, the circuit further comprising:
    a power control bit sign detector for determining said sign of said power control bit portion;
    a multiplexer for combining said sign corrected power control bit portion with said pilot signal portion to generate said channel signal.

5. A circuit for adaptively estimating channel conditions of a pilot channel in a wireless communication system, the circuit comprising:
  a channel statistics estimator that estimates channel statistics of said pilot channel; and
  an adaptive pilot filter that adaptively filters said pilot channel in response to said estimated channel statistics;
  wherein said channel statistics estimator filters a channel signal derived from said pilot channel to determine an estimated channel mean and an estimated channel covariance,
  wherein said channel statistics estimator partitions said pilot channel into one or more time slots,
  wherein said adaptive pilot filter weights each time slot according to said channel statistics,
  wherein said pilot channel comprises a sequence of power control groups, each power control group having a pilot signal portion having a known sign and a power control bit portion having an unknown sign, and wherein said time slot has a duration substantially equal to the duration of said pilot signal portion.

* * * * *